Figure 1:
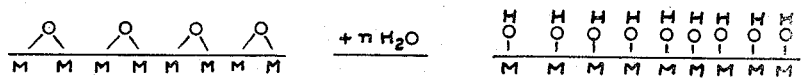

Jan. 8, 1957  F. C. BERSWORTH  2,776,918
METHOD AND COMPOSITION FOR APPLICATION OF PROTECTIVE
CHELATE-CONTAINING COATING TO SURFACES
AND ARTICLE FORMED THEREBY
Filed July 21, 1952

Inventor:
Frederick C. Bersworth
by his Attorneys,
Darby & Darby

United States Patent Office 2,776,918
Patented Jan. 8, 1957

2,776,918

METHOD AND COMPOSITION FOR APPLICATION OF PROTECTIVE CHELATE-CONTAINING COATING TO SURFACES AND ARTICLE FORMED THEREBY

Frederick C. Bersworth, Framingham, Mass., assignor to The Dow Chemical Company, Midland, Mich., a corporation of Delaware Application July 21, 1952, Serial No. 300,600

14 Claims. (Cl. 148—6.14)

This invention relates to protective coating compositions and their application, and to finished articles characterized by having thereon protective coatings applied with a molecular interlayer of a complexing material which materially enhances the adhesion of the protective coating to the undersurface.

In the application of a protective coating to a base frequently problems of adhesion occur. Where the surface to be protected is a metal, or glass, and the coating to be applied is a resin base paint, poor adhesion is obtained, and frequently it is so bad that if it occurs at all, the paint flakes off under the slightest abrasion, or permits corrosion of the under surface to occur. In electroplating and painting on metals the preliminary cleaning operation involves scrubbing with an alkali or detergent solution. Sometimes this is followed by an acid dip and a superficial degree of etching to permit anchoring the protective coating to the surface. Following the cleansing operation the surface is thoroughly rinsed so that the coating is applied directly to the chemically clean surface.

It is a fundamental object of the instant invention to provide a method of applying paints and protective coating materials to metal bases to develop very firm adhesion, the method developing a chemical union of a molecular film with the surface which in turn unites with an applied coating material.

It is another object of the invention to provide a protective coating composition characterized by its capacity to form upon application to a clean surface, a film adjacent to the surface, which film functions to unite chemically with corrosion products or incipient corrosion products on the surface and protect it from further corrosion.

It is another object of the invention to provide a method of applying a protective molecular chemical film to a surface.

It is a further object of the invention to utilize superficial differential oxidation products in a surface to form a chelate ring bonded molecular film on the surface to prepare the surface for a protective coating.

Other objects and advantages of the invention will in part be obvious and in part appear hereinafter.

Briefly, the invention is directed to a method of pretreating metal surfaces and protecting such surfaces, and as a secondary aspect thereof, includes a composition for treating such surfaces and the object so coated. The invention in its several aspects is characterized by the formation on a surface of an adherent molecular film united to the surface through chelate linkages, the remaining portions of the molecule preferably carrying groups oriented outwardly from the metal surface, thereby being available for solution in and physicochemical union with protective coating material applied to the surface. The process of so treating metal surfaces and depositing such a coating thereon comprises treating the surface with a solution of a tertiary amino acid and derivatives thereof in which substituent groups in the molecule may or may not be active for forming chelate rings. Thus, the invention is embodied in the process of applying to a surface of metal or glass, either separately or in a composition of a protective coating, a solution of a chelate-forming compound so that there is formed with the surface itself a compound wherein the surface furnishes a portion of the chelate ring united to the surface through reaction of the chelate-forming compound with atoms in the surface itself. Accordingly, the invention comprises the steps and combinations of steps and relation of one or more to each of the others, the compositions having the characteristics, ingredients, properties and relation of ingredients hereinafter set forth, and the product having the features, properties and combination of elements, all as hereinafter exemplified in the detailed disclosure, the scope of the invention being indicated in the claims.

The basis on which it is believed the invention finds its utility in improving the adhesive qualities of a protective coating on a surface is set forth in the following general description thereof and the specific examples subsequently given. Illustrative reference to the drawing is made wherein Figures 1 through 6 are diagrammatic indications of how reaction takes place at a metal surface.

Useful compounds from which chelate rings are readily formed for carrying out this invention may be formulated generally as follows:

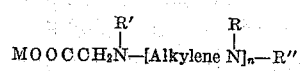

wherein M is one of the group hydrogen, alkali metal, ammonium, alkylammonium; R, R' and R" are the same or different members of the group —CH$_2$CH$_2$OH, —CH$_2$COOM, —CH$_2$CH$_2$COOM, and alkyl groups; the alkylene is of the group —CH$_2$CH$_2$CH$_2$—, —CH(CH$_3$)CH$_2$—, —CH$_2$CH$_2$—, =CH—CH=; and $n$ is 0, 1, 2, 3 or 4. In any form of the compound, monomer or polymer, substitution to the extent of 1, 2, 3 or 4 groups, extending to the available positions, produces a compound having the potential capacity to form chelate rings. By substituting the chelate-forming groups in a sufficient number of places in the molecule to give it a large capacity for chelating and by substituting other polar groups, such as alcoholic groups, ester groups and the like, on other positions of the nitrogen through the molecule, a compound is obtained which has in addition to the chelate forming capacity, a residue containing groups related to the oleaginous, resinous and hydrocarbonaceous constituents of paints. Thus the structure of the molecule is such that it is at once chelate-forming in one or more places and compatible with paint films.

For example, compounds of this type may be derived from the salts of ethylenediamine, as follows:

(1)
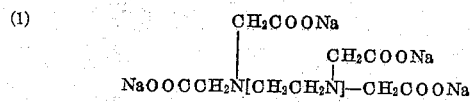

this tetra acetic acid salt corresponds to the general formula given wherein M is sodium, R, R' and R" are each —CH$_2$COONa, alkylene N is —CH$_2$CH$_2$— and $n$ is 1.

(2)
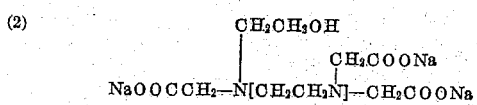

this compound follows the general formula in the same way that (1) does, but makes R' an ethanol group.

(3)

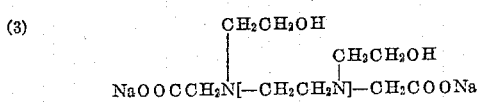

this compound follows the general formula in the same way that (1) does, but makes R' and R ethanol groups.

(4)

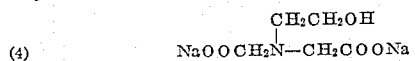

this compound follows the general formula like (1) does, but makes $n=0$ and R' an ethanol group.

(5)

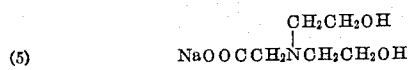

this compound follows the general formula like (1), but makes $n=0$ and R' and R" ethanol groups.

In the manner outlined, the various substituents indicated in the general formula may be varied to derive compounds having chelate ring forming capacity, by virtue of which they can react with the surface, and also having other groups thereon to render them fully compatible with applied protective coatings. Thus the alkylene group is preferably a di- or trimethylene group but may be a cyclic group, such as that derived from cyclohexane.

When reacted with a metal surface, the compound will form chelate rings with molecules in the metal surface if contacted with the surface by dipping the metal object in a solution of the compound or wetting the surface of the metal with a solution of the compound.

In the drawings accompanying this specification, a graphical representation of this formation of protective films on surfaces is given. In each of the Figures 1 through 6 the straight horizontal line represents the macroscopic tangible surface of a metal; the M's represent metal atoms in the surface, and in Figures 3 and 4 the irregular line drawn above and below the horizontal line represents the actual surface as it would appear if magnified many times.

In Figure 1 the steps involved in corrosion of a metal by oxygen and water are shown, the corrosion being formulated as first the formation of the suboxide wherein possibly a pair of metal atoms binds an oxygen atom, and upon reaction with water the metal hydroxide is formed at the surface.

Figure 2:
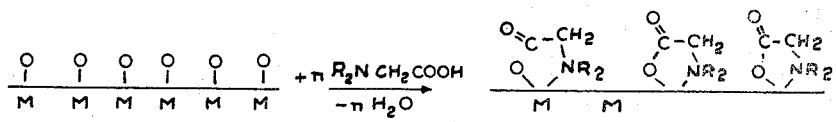

In Figure 2 the statement is varied to indicate that a metal oxide or suboxide has been formed at the surface and, in this case, is reacted with an amino acid, the formula being generalized essentially as the formula indicated above. The amino acid reacts with the metal oxide at the surface to form chelate rings in which the carbon and nitrogen of the acid form a heterocyclic ring attached to the metal surface, the metal of the surface forming part of the heterocyclic ring. It will be apparent that the phenomena involved in carrying out this reaction result in chemically reacting the compound with the metal surface and leaving the residual part of the molecule at the surface.

Figure 3:
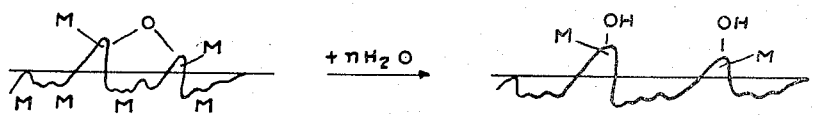

In Figure 3 the representation of essentially the same reaction as that shown in Figure 1 is indicated. These active centers of microscopic or sub-microscopic size on the metal surface furnish the metal atoms to form a surface suboxide with oxygen, which, upon reaction with water, forms metal hydroxide at the surface.

Figure 4:
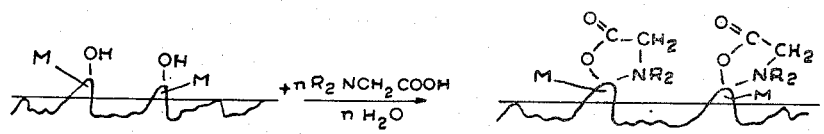

In Figure 4 the reaction of this layer of metal hydroxide with the chelating agent is shown, wherein the chelate ring centering on the heavy metal atom in the metal surface is formed.

Figure 5:
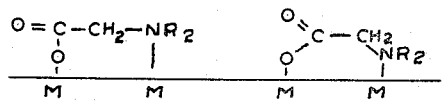

In Figure 5 a possible variation of the manner of the formation of chelate rings at the metal surface is shown, for there the formation of the ring through reaction of the tertiary amino acid with two metal atoms is shown.

Figure 6:
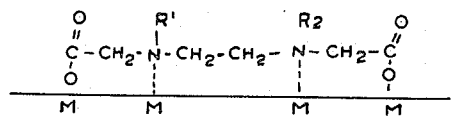

In Figure 6 the same formulation essentially is shown, but with a polymer of the amino acid, wherein by the inclusion of more acid groups in the long chain amino acid formation of chelate rings on two or more parts of the complexing molecule with metal atoms in the surface may be brought about. When a surface is thus treated with one of these chelating agents it is first cleared of oxide or suboxide at the superficial surface and chemical union of the chelating agent with the metal surface occurs to an extent such that a molecular layer of the chelating compound on the surface is formed.

It will be seen thus that a film is formed on a surface, which film is characterized by chemical union with the surface, to leave available groups of a hydrocarbonaceous or functional nature, which groups are compatible with a wide variety of protective coating materials. The molecular layer also serves to protect the surface from moisture and additional corrosions. It is thus possible to deposit a protective coating on a metal surface, which coating will not rely upon simple adhesion to the surface, but by dissolving the functional unreacted portion of the chelate-forming molecule, it will be essentially in chemical union with the underlying metal surface.

It has been found thus that melamine urea formaldehyde, polyethylene resins, polyfluorethylenes, e. g. polytetrafluoroethylene, natural and synthetic rubber latexes, conventional type paint compositions and similar resin-base lacquer protective coating materials are substantially more adherent to metal surfaces when applied thereto in the presence of a small amount of chelating agent of the type set forth above. The surfaces to which such films are applicable may be of any type, for example, they may be glass, various ferrous alloys, e. g., iron-chromium-nickel stainless steel, cadmium, Monel metal, copper, brass, zinc, tin, lead. In general any surface containing a divalent metal or metal which has a divalent state, except alkaline earth metals, may be treated in accordance with this invention.

When a water base resinous emulsion type paint is applied to structural metal, for example steel, or bare iron, a strong tendency exists for corrosion to occur under the paint film while the paint is drying. When this corrosion occurs, rust stains and blisters appear, the paint fails to adhere and flakes off quickly. A typical example of this type of outdoor paint used generally is a polystyrene emulsion paint. I have found that if about 0.5 percent by weight, based on the paint, of the sodium salt of a tertiary amino acid is added, the corrosion problem is completely overcome and the paint adheres extremely strongly. The mechanism by which this action appears to take place is that the added salt forms a chelate ring by reaction with superficial oxide or suboxide on the metal surface. It accordingly chemically unites with such corrosion products as oxide on the surface, protects the metal surface from electrolytic corrosion during the drying of the paint and forms a molecular film uniting the paint film to the metal base.

In the same general family of polystyrene emulsion type paints there are many other emulsion type plastic paints and rubber base paints. Generally the behavior of plastic base paints on metal surfaces is like that of polystyrene, that is, the water emulsion, while being a convenient medium for handling, creates the problem of forming ideal surface corrosion conditions when it is applied to a metal base.

In all these cases the plastic base emulsion type paint may be made to adhere firmly to a metal base by the incorporation in the composition of 0.5 percent to about 3 percent of the tertiary amino acid chelating agent.

Rubber latex emulsion paints are closely analogous in their behavior to plastic base paints, but add a further complication. Latexes, whether natural or synthetic, are very sensitive to the presence of polyvalent metal ions, particularly copper, manganese and iron. Calcium and magnesium, two metals commonly found in hard water, will also cause coagulation when added to latex paints. Inasmuch as rubber latex paints employ water as the continuous phase, and water is the recommended diluent, the severe limitation placed upon their usefulness in hard water areas is apparent. The tertiary amino acid chelating agents are useful in rubber latex paints for they complex, inactivate and retain in solution all di and polyvalent metal ions which may be present. At the same time the excess complexing agent will form the chelate ring with the metal base to which it is applied and thus enhance the firmness of adhesion of the paint film. Thus by inactivating all polyvalent metal ions present in the system, the system considered being the paint composition and the surface to which it is applied, the stability of the emulsion, which is the paint composition, is enhanced and ideal conditions for application are maintained, in that the desired drying of the paint film from the colloidal state is brought about and, through the presence of the chelate ring molecular film on the base, the adhesion of the rubber to the surface is enhanced.

Thus it appears that when water emulsions of any type are used as paints a variety of factors create specific problems, the most important of which is surface corrosion which is bound to appear if the water emulsion paint is applied to a base metal. The water contains ions which convert it to a good electrolyte and electrolytic corrosion, proceeds until evaporation is complete and the film is completely dry. During the process accumulation of oxide and hydroxide occurs. With most metals this deposit is not only colored but is bulky and non-adhesive and any paint film covering such spots adheres not to the base metal but to the corrosion product, with the end result that poor adhesion and color staining of the dried emulsion become quickly apparent. By the addition of 0.5 percent to about 3 percent of the tertiary amino acid chelating agents to the colloidal emulsion these difficulties are overcome. Corrosion is not only prevented but the chelating agent in the paint dissolves and disperses corrosion products on the surface, thus permitting firm adhesion of the paint film. When the emulsion is finally dry, it is bonded to the base metal through a chelate ring rather than being merely dried superficially over corrosion products. The reaction is the same when the chelating agent is used in an aqueous emulsion regardless of whether the suspended material is rubber, vinyl resin, fluorinated hydrocarbon, such as Teflon, the vinyl and vinylidene copolymers, styrene or any other organic or inorganic material.

The several aspects of the invention may be readily understood by consideration of the following specific examples.

*Example 1.*—A steel specimen was subjected to ordinary cleaning involving scraping and sanding to the bare metal and then painted with an aqueous emulsion polyvinyl chloride paint. Within a day after drying traces of discoloration were noted in the paint and a test of the adhesion made by dipping the painted area in 5 percent sulfuric acid resulted in stripping the paint within about 50 seconds.

*Example 2.*—Similar tests carried out on galvanized iron, copper, aluminum and brass surfaces gave comparable results in each case. That is, the aqueous base of the paint aids in corroding the underlying surfaces and only moderately satisfactory adhesion of the paint is secured. Also directly comparable results are obtained with other emulsion type paints, such as styrene, fluorinated hydrocarbons and rubber latex paints.

*Example 3.*—Steel, copper, aluminum and brass specimens are cleaned with a solution containing 1 percent of a sodium salt of ethylene diamine tetra acetic acid, the solution having a pH 8. The cleaning or pretreating may be carried out simply by wiping the surface carefully with the solution of the amino acid, and, in the process, it is observed that most of the superficial rust disappears. The wet surface is permitted to dry so that the amino acid chelating agent in solution will have ample time to react and bind with the surface. It is subsequently found that surfaces so treated and then painted with water base emulsion plastic paints, where the plastic may be a vinyl plastic, styrene, fluorinated hydrocarbon, or rubber, results in the formation of a paint film which shows no trace of discoloration due to the production of corrosion products under the film and, when subjected to the acid immersion treatment, as a measure of adhesivenes, shows improvement in adhesiveness ranging from 100 to 400 percent over the paint applied to untreated surfaces.

*Example 4.*—The basic requirement in the application of paint to metal surfaces in accordance with this invention and, utilizing commercially available paints, generally in aqueous emulsion form, is that the water be the continuous phase of the paint emulsion and 0.1 to about 5 percent of any of the chelate-forming compounds formulated generally above be incorporated in the aqueous phase. The paint thus develops the capacity of uniting chemically with the metal surface to which it is applied, for during the drying period of the paint the chelate-forming compound in the continuous phase will reach the metal surface, react therewith and form a molecular layer fully compatible with the resinous or oleaginous phase of the paint.

Paints formulated with the heavily fluorinated hydrocarbons, for example, tetrafluoro ethylene polymer, form an excellent protective coating material, because the polymer is so inert to most adverse destructive conditions. However, the commercial paints are not very adherent when applied to metal surfaces. The incorporation of about 0.1 percent of the water-soluble chelate-forming compounds corresponding to the general formula given above, and in particular the simplest of the derivatives, namely, tetra acetic acid salt of ethylene diamine, improves the adhesion substantially for the aqueous phase of the paints so treated is then capable of wetting both the surface to which it is applied and the plastic film formed by the paint. Test strips of steel prepared by the addition of the 0.1 percent of this chelating agent to a commercial polytetrafluoro ethylene enamel were made by coating the strips with the enamel. Strips were immersed in water, in propylene glycol and in isopropyl alcohol for forty hours and a strip was then set in a baking oven at 250° for 16 hours. The several samples showed no change in appearance, nor could the enamel be stripped from the base. A similar sample tested by immersion in 5 percent sulfuric acid resisted the acid for several days and no pin holes appeared. A control sample painted with the enamel without the chelating agent and tested in sulfuric acid was stripped quickly; within one-half hour under any of the above conditions the film was loosened.

*Example 5.*—A parallel series of tests was conducted employing a primer coat for the polytetrafluoroethylene enamel, the primer coat again being the commercial primer offered for use with that enamel. The results were directly parallel in that the chelating agent incorporated in the primer or applied to the metal strip before application of the enamel resulted in the production of substantially greater adhesion. Exactly parallel results were obtained when the enamel was applied under similar conditions to galvanized and tinned steel bases.

*Example 6.*—Corresponding improvements in adhesion of paint films using polystyrene and polyvinyl chloride film-forming ingredients in aqueous emulsion were obtained when applied to metal bases, steel, galvanized steel and tinned bases, and tested under corresponding conditions. The improvement is most apparent through substantially greater adhesion of the paint film and the essential elimination of blistering and appearance of pin holes and oxidation centers in the paint film.

*Example 7.*—In a further test, steel plates were taken, one of which was treated with the dibutyl ester of ethylene diamine triacetic acid salt, while the other was untreated and kept as a control. Neither sheet was subjected to any precleaning and they were treated as metal surfaces normally are immediately prior to painting, that is, only loose dirt and rust were scrubbed or scraped loose prior to the painting. The two steel plates were immersed in 25 percent protein hydrolyzate solution and very quickly the untreated sample became quite rusty and the solution of protein hydrolyzate changed viscosity within a few days. The chelate coated plated showed no change in the protein solution and maintained its original viscosity for a test period lasting a week. The general application of this protective procedure for steel coatings is apparent for in the shipping of protein hydrolyzates the preservation of the material in the drum is extremely important. Where corrosion of the inside of the steel drum occurs to any extent at all, the passage of ferric or ferrous ions into the solution of hydrolyzate has a catalytic effect and hastens and progressively accelerates the deterioration of the solution. By the application of a chelate coat to the inside of a steel drum, this of course is prevented.

*Example 8.*—For many purposes the application of micro-crystalline wax coating to steel plate is desirable. Accordingly two sample steel plates were prepared for coating with micro-crystalline wax. One was treated with a solution of chelating agent and the other left untreated. In the untreated steel plate incipient corrosion and rust was noticed within two days, while the chelate coated plate showed no change in the micro-crystalline wax film during the full ten day period of the test. Paralleling the application of the chelate coating to the protection of steel drums for use in handling protein hydrolyzate solution, a scratch was made in the samples carrying the micro-crystalline wax coating and the plates then immersed in the protein solution. The plate carrying the chelate coating under the wax showed no peeling or effect on the wax coating whatsoever. Also, no alteration in the viscosity of the protein solution was detected after a week's immersion. Where the scratch was made in the sample not carrying the chelate under-coat, progressive deterioration of the metal base and solution was observed.

*Example 9.*—Tests paralleling those made with the protein hydrolyzate solution were made with casein solutions and directly parallel results obtained.

*Example 10.*—An adherent deposit of copper may be plated onto iron surfaces of iron powder by first washing the iron surface or powder with a 5 percent solution of chelating agent, for example, the tetra acetic acid salt of ethylene diamine, and then immersing the iron in a copper-cyanide bath. The copper deposit so obtained will be very adherent and continuous. Similarly, copper may be immersed in a 5 percent chelate solution slurried for a few minutes, following which copper oxide is added. The copper oxide forms the chelate which in turn produces a very effective immersion plate of copper on iron surfaces. In the same manner, other immersion plates such as lead, cadmium, zinc and the like, may be formed on base metal surfaces.

*Example 11.*—The cleaning and pre-treating of non-ferrous surfaces is best exemplified by employing brass such as that which is used in the formation of lamp sockets. In conventional operations these pieces must be cleaned and bright dipped with a soldering flux prior to passing through the machine. By employing the chelating agent on the brass surfaces it is possible to solder these pieces without the prior treatment. The brass surface to be soldered is brushed with a 5 percent aqueous solution of any of the chelating agents corresponding to the general formula given, for example, the tetra acetic acid salt of ethylene diamine containing about 0.5 percent glycerine. Since the surfaces were hot, the aqueous solvent evaporated quickly leaving the chelate compound behind to form a film. The common lead-tin solder, even without the fluxing agent, flowed freely on the surfaces so treated to give perfect joints. In this operation when chelating agents employing a butyl or isopropyl group in the $R_2$ position are used, no glycerine is needed in the aqueous solution.

*Example 12.*—When an aluminum sheet or specimen is dipped in a 2 to 5 percent solution of chelating agent corresponding to the general formula given at a pH which avoids the formation of sodium aluminate, that is, a chelate below about 9.5, a hemi chelate of aluminum is formed, that is, a layer of chelate rings reacted with the surface of the metal aluminum is formed. When permitted to dry, this film will completely protect the aluminum against further corrosion and the aluminum can be welded at any time. I have found it possible to weld the aluminum so treated after a week's exposure to normal atmospheric conditions. Where the film so deposited on an aluminum surface has hydrocarbonaceous groups in the R, R' and R" positions, it is strongly hydrophobic and therefore becomes quite resistant to destruction and extends the period of protection of the base surface.

Although the invention has been described in connection with a number of metal surfaces in order to illustrate the basic principle of forming a molecular protective layer on a metal surface by creating the system involving the surface to be protected and a medium carrying the chelating agent to be reacted with the surface in order to form on the surface a molecular layer, it is to be understood, therefore, that the invention may be carried out under a variety of conditions without departing from the spirit or scope thereof.

What is claimed is:

1. A paint composition comprising an aqueous medium having colloidally dispersed therein an organic resinous film-forming material, said paint composition being characterized by its containing from about 0.1 percent to about 5 percent of a chelating agent, based on the total weight of the paint composition, said chelating agent corresponding to the general formula:

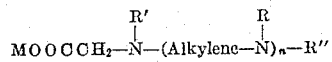

wherein M is a member of the group consisting of hydrogen, alkali metal, ammonium, alkylammonium; R, R' and R" are members of the group consisting of —CH₂CH₂OH, —CH₂COOM, —CH₂CH₂COOM, and alkyl groups and may be the same; alkylene is selected from the group consisting of —CH₂CH₂CH₂—, —CH(CH₃)CH₂—, —CH₂CH₂—, =CH—CH=; and $n$ is an integer in the range 0, 1, 2, 3, 4.

2. A paint composition in accordance with claim 1 in which the film-forming phase is a styrene resin.

3. A paint composition in accordance with claim 1 in which the film-forming phase is a vinyl resin.

4. A paint composition in accordance with claim 1 in which the film-forming phase is a fluorinated hydrocarbon resin.

5. A paint composition in accordance with claim 1 in which the film-forming phase is a rubber.

6. A paint composition in accordance with claim 1 in which the chelating agent is a salt of ethylene-diamine-tetraacetic acid.

7. An article of manufacture comprising an object having surfaces formed of metallic iron, the object being characterized by its surfaces being covered with a protective paint film, which painted surfaces are free from corrosion spots in the paint film said paint film having been formed from a water base paint carrying a colloidally dispersed organic resinous film-forming material, wherein the water phase contained an amino acid chelating agent.

8. The method of rendering an aqueous coating composition, comprising an aqueous colloidal dispersion of a film-forming resin, non-corrosive to solid surfaces formed from iron metal to which the composition is applied, which method comprises incorporating in said coating composition a chelating agent in amount corresponding to about 0.1 percent to about 5 percent by weight of the composition, said chelating agent corresponding to the general formula

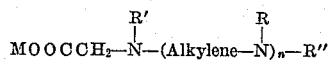

wherein M is a member of the group consisting of hydrogen, alkali metal, ammonium, alkylammonium; R, R' and R'' are members of the group consisting of $CH_2CH_2OH$, $-CH_2COOM$, $-CH_2CH_2COOM$, and alkyl groups and may be the same; alkylene is a member of the group consisting of $-CH_2CH_2CH_2-$, $-CH(CH_3)CH_2-$, $-CH_2CH_2-$, $=CH-CH=$; and $n$ is an integer in the range 0, 1, 2, 3, 4.

9. The method in accordance with claim 8 in which the chelating agent is ethylene diamine tetraacetic acid.

10. The method in accordance with claim 8 in which the chelating agent is hydroxyethylethylenediamine-triacetic acid.

11. The method in accordance with claim 8 in which the chelating agent is dihydroxyethylethylenediamine-diacetic acid.

12. The method in accordance with claim 8 in which the chelating agent is nitrilotriacetic acid.

13. The method in accordance with claim 8 in which the chelating agent is dihydroxyethylaminoacetic acid.

14. The method of painting structural iron surfaces with a thin layer of an aqueous coating composition and drying said layer to provide a coating thereon without the occurrence of rust in the iron surfaces during such operations, which method comprises applying to the said structural iron surface a thin layer of an aqueous coating composition containing a film-forming resin colloidally dispersed in an aqueous solution containing an amino acid chelating agent in amount corresponding to at least 0.1 percent to about 5 percent by weight of the entire coating composition and drying such layer.

References Cited in the file of this patent

UNITED STATES PATENTS

| | | |
|---|---|---|
| 2,165,099 | Hansen | July 4, 1939 |
| 2,396,938 | Bersworth | Mar. 19, 1946 |
| 2,413,857 | Bersworth | Jan. 7, 1947 |
| 2,417,885 | Powell | Mar. 25, 1947 |
| 2,560,741 | Provost | July 17, 1951 |

FOREIGN PATENTS

| | | |
|---|---|---|
| 277,372 | Great Britain | Dec. 12, 1928 |

OTHER REFERENCES

Mitchell et al.: Industrial and Engineering Chemistry, August 1949, pages 1592–1599.

Hackh's Chemical Dictionary, The Blakiston Co., 3rd ed., 1944, p. 187.